United States Patent
Hong

(10) Patent No.: US 11,881,940 B2
(45) Date of Patent: Jan. 23, 2024

(54) METHOD AND SYSTEM FOR PROVIDING SECURE MESSAGE

(71) Applicant: LINE Plus Corporation, Seongnam-si (KR)

(72) Inventor: Seokju Hong, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 857 days.

(21) Appl. No.: 16/288,711

(22) Filed: Feb. 28, 2019

(65) Prior Publication Data

US 2019/0281069 A1     Sep. 12, 2019

(30) Foreign Application Priority Data

Mar. 6, 2018 (KR) .......................... 10-2018-0026246

(51) Int. Cl.
*H04L 9/40* (2022.01)
*H04W 12/106* (2021.01)
*H04L 51/222* (2022.01)

(52) U.S. Cl.
CPC .......... *H04L 63/123* (2013.01); *H04L 51/222* (2022.05); *H04L 63/0428* (2013.01); *H04W 12/106* (2021.01)

(58) Field of Classification Search
CPC ... H04L 63/12; H04L 63/123; H04L 63/0428; H04W 12/106; H04W 12/108
See application file for complete search history.

(56) References Cited

U.S. PATENT DOCUMENTS

| | | | |
|---|---|---|---|
| 10,419,444 B2 * | 9/2019 | Hsun | H04L 51/12 |
| 2015/0082391 A1 | 3/2015 | Lerman et al. | |
| 2018/0019959 A1 * | 1/2018 | Shing | H04W 12/033 |
| 2018/0176160 A1 * | 6/2018 | Steller | H04L 67/1095 |

FOREIGN PATENT DOCUMENTS

| | | | |
|---|---|---|---|
| CN | 107450801 A | * 12/2017 | ............. G06F 21/84 |
| CN | 108052267 A | * 5/2018 | |
| JP | 2005-182774 A | 7/2005 | |
| JP | 2007-310601 A | 11/2007 | |
| JP | 2017-195920 A | 11/2017 | |
| JP | 2018-005425 A | 1/2018 | |
| KR | 20150064655 A | 6/2015 | |
| KR | 20150075349 A | 7/2015 | |
| KR | 20160009698 A | 1/2016 | |
| KR | 10-1644168 B1 | 7/2016 | |
| KR | 10-1644716 B1 | 8/2016 | |

OTHER PUBLICATIONS

KROA issued on Jan. 30, 2019 by the KR Patent Office corresponding to KR application No. 10-2018-0026246.
Japanese Office Action dated Feb. 14, 2023 issued in corresponding Japanese Patent Application No. 2019-024516.

* cited by examiner

*Primary Examiner* — Esther B. Henderson
(74) *Attorney, Agent, or Firm* — Harness, Dickey & Pierce, P.L.C.

(57) ABSTRACT

A secure message providing method may be performed by a system or apparatus for providing a secure message. The secure message providing method may secure content of a secure message by limiting the content of the secure message to be verified while a secure condition set by a first user side is being met by a second user side with respect to secure messages transmitted and received between users through a messaging service.

16 Claims, 13 Drawing Sheets

METHOD AND SYSTEM FOR PROVIDING SECURE MESSAGE

CROSS-REFERENCE TO RELATED APPLICATION(S)

This U.S. non-provisional application claims the benefit of priority under 35 U.S.C. § 119 to Korean Patent Application No. 10-2018-0026246, filed on Mar. 6, 2018, in the Korean Intellectual Property Office (KIPO), the entire contents of which are incorporated herein by reference.

BACKGROUND

Field

One or more example embodiments relate to a method, apparatus, system, and/or non-transitory computer readable medium for providing a secure message, and more particularly, to a secure message providing method that may protect content of a secure message by limiting the content of the secure message to be verifiable while a secure condition set by a first user side is being met by a second user side with respect to secure messages transmitted and received between users through a messaging service, a computer apparatus for performing the secure message providing method, a system for performing the secure message providing method, and/or a non-transitory computer-readable medium storing instructions that, when executed by at least one processor, causes the at least one processor to implement the secure message providing method on the computer apparatus.

Description of the Related Art

In an existing messaging service, the security of a message is limited to the security of a message transmission between a server and a client. For example, there may be security for protecting against a third user (e.g., an unauthorized user) from intercepting a message that a first user intends to transmit to a second user through a server.

As another example of the security of a message, a message security system may provide a plug-in for a social network service messenger program to encrypt/decrypt a portion of, or all of, a message. To this end, the message security system may generate, store, and distribute a common encryption key available by all of the users and different group encryption keys for the respective user groups, and may provide messages of different security levels based on security levels of the user groups on a social network service. However, even in this case, any user who accesses a message through a terminal having a distributed key may verify the content of the message. For example, if a terminal that stores the distributed key is lost/stolen/etc., another user that acquires the lost/stolen terminal may access the content of the message.

SUMMARY

One or more example embodiments provide a secure message providing method that may protect content of a secure message by limiting the content of the secure message to be verifiable while a secure condition set by a first user side is being met by a second user side with respect to secure messages transmitted and received between users through a messaging service, a computer apparatus for performing the secure message providing method, and/or a non-transitory computer-readable medium storing computer readable instructions that, when executed by at least one processor, cause the at least one processor to implement the secure providing method on the computer apparatus.

According to an aspect of at least one example embodiment, there is provided a secure message providing method including establishing a communication session between an account of a first user and an account of a second user through a messaging service; receiving a secure message from a first terminal of the first user through the established communication session, the secure message including content that is hidden; receiving a secure condition corresponding to the secure message through the established communication session, the secure condition set by the first user; determining whether a condition of a second terminal of the second user meets the received secure condition; and displaying the content of the secure message on the second terminal through a user interface corresponding to the established communication session while the secure condition is being met, the content being enabled for viewing by the second user.

The secure condition may include at least one of (1) a first condition requiring information corresponding to at least one of a text, an image, an audio, and a video selected or input by the first user is selected, input, displayed, or played on the second terminal, (2) a second condition requiring environment setting information selected or input by the first user is set as environment setting information on the second user terminal, and a third condition requiring the second terminal is located at a geographical location or place selected or input by the first user.

The secure message providing method may further include storing the received secure message in a message database on the second terminal; and storing the secure condition in a secure area of the second terminal.

The secure condition may include includes an image selected or input by the first user on the first terminal, and the determining may include determining that the received condition is met while the same image as the image included in the secure condition is selected or input through a function of the user interface displayed on the second terminal and is being displayed through the user interface.

The secure message providing method may further include setting a first area in the user interface, the first area associated with the secure message, and the displaying may include displaying, on the user interface, the same image selected or input through the function of the user interface on the second terminal; adjusting a location of a second area on which the same image is displayed in response to an input of the second user on the same image displayed on the user interface; and displaying at least a portion of the content of the secure message on a third area of the user interface on which the second area is overlaid on the first area.

The secure condition may a brightness value or a brightness value range of a display selected or input from the first user on the first terminal, and the determining may include determining that the received secure condition is met while a brightness value of a display of the second terminal corresponds to the brightness value or the brightness value range included in the secure condition.

The secure condition may include audio data selected or input from the first user on the terminal of the first user, and the determining may include determining that the received secure condition is met while the audio data included in the secure condition is being input through an audio input device included in the second terminal.

The secure message providing method may further include displaying notification information through the user interface in response to the received secure condition not being met, the notification information regarding reception of the secure message, and the displaying of the content of the secure message may include replacing the notification information with the content of the secure message and displaying the content of the secure message through the user interface while the secure condition is being met, the content being enabled for viewing.

The receiving may include further the receiving comprises further receiving display information to be displayed as the notification information from the first terminal, and the displaying of the notification information comprises displaying the received display information through the user interface as the notification information.

According to an aspect of at least one example embodiment, there is provided a secure message providing method including establishing a communication session between an account of a first user and an account of a second user through a messaging service; generating a user interface, the user interface for setting a secure condition for a secure message, the secure message including content that is hidden; verifying the secure condition set by the first user using the user interface; and transmitting the secure message and the set secure condition to a second terminal of the second user through the communication session, the transmitting of the secure message causing the second terminal to display the secure message while the set secure condition is being met by the second terminal, the content being enabled for viewing by the second user.

There is provided a computer program stored in a non-transitory computer-readable medium to implement the secure message providing method on a computer apparatus in conjunction with the computer apparatus.

There is provided a non-transitory computer readable medium storing computer readable instructions that, when executed by at least one processor, cause the at least one processor to implement the secure message providing method on a computer apparatus.

According to an aspect of at least one example embodiment, there is provided a computer apparatus including at least one processor configured to execute computer-readable instructions. The at least one processor is configured to establish a communication session between an account of a first user and an account of a second user through a messaging service provided from a messenger server; to receive a secure message and a secure condition set by a terminal of the first user from the terminal of the first user through the established communication session; to determine whether a terminal of the second user meets the received secure condition; and to display content of the secure message through a user interface corresponding to the established communication session while the secure condition is being met.

According to an aspect of at least one example embodiment, there is provided a computer apparatus including at least one processor configured to execute computer-readable instructions. The at least one processor is configured to establish a communication session between an account of a first user and an account of a second user through a messaging service provided from a messenger server; to provide a user interface of setting a secure condition for a secure message that is to be transmitted through the communication session; to verify a secure condition set by the first user using the user interface; and to transmit the secure message and the set secure condition to a terminal of the second user through the communication session to display the secure message on the terminal of the second user while the set secure condition is being met by the terminal of the second user.

According to some example embodiments, it is possible to protect content of a secure message by limiting content of the secure message to be verifiable while a secure condition set by a first user side is being met by a second user side with respect to secure messages transmitted and received between users through a messaging service.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
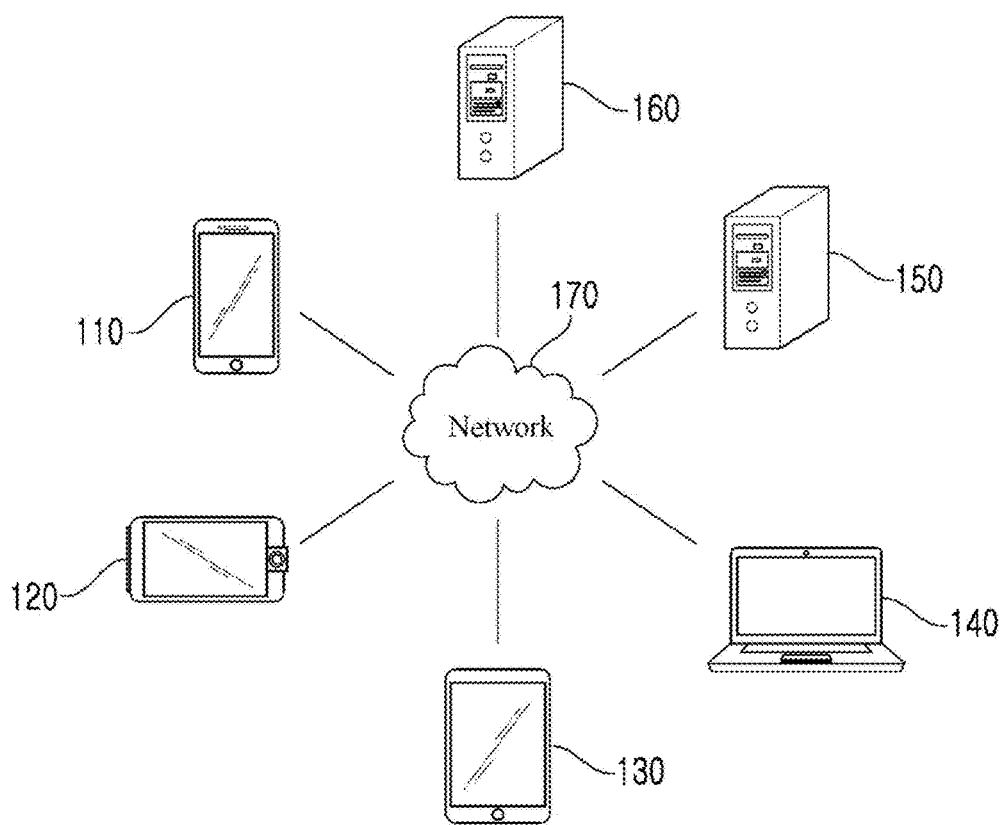
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the special purpose program code is loaded into a processor, the processor becomes specially programmed to perform the special purpose program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A secure message providing method according to one or more example embodiments may be implemented through a computer apparatus, such as an electronic device, which is described below. Here, a computer program according to one or more of the example embodiments may be installed and executed on the computer apparatus and the computer apparatus may perform the secure message providing method according to one or more of the example embodiments under control of the executed computer program. The aforementioned computer program may be stored in a non-transitory computer-readable medium to implement the secure message providing method on the computer apparatus in conjunction with the computer apparatus.

FIG. 1 is a diagram illustrating an example of a network environment according to at least one example embodiment. Referring to FIG. 1, the network environment includes a plurality of electronic devices 110, 120, 130, and 140, etc., a plurality of servers 150 and 160, etc., and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates the electronic device 110 in the shape of a smartphone, it is provided as an example only. Here, the electronic device 110 may refer to any type of various physical computer apparatuses capable of communicating with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only examples of possible network configuration(s) and the example embodiments are not limited thereto.

Each of the servers 150 and 160 may be configured as a computer apparatus or a plurality of computer apparatuses that provides computer readable instructions, codes, files, contents, services, and the like through communication with the plurality of electronic devices 110, 120, 130, and/or 140 over the network 170. For example, the server 150 may be a system that provides a service, for example, a social network service, a messaging service, a search service, a mail service, and a content providing service, etc., to the plurality of electronic devices 110, 120, 130, and/or 140 connected over the network 170.

Figure 2:
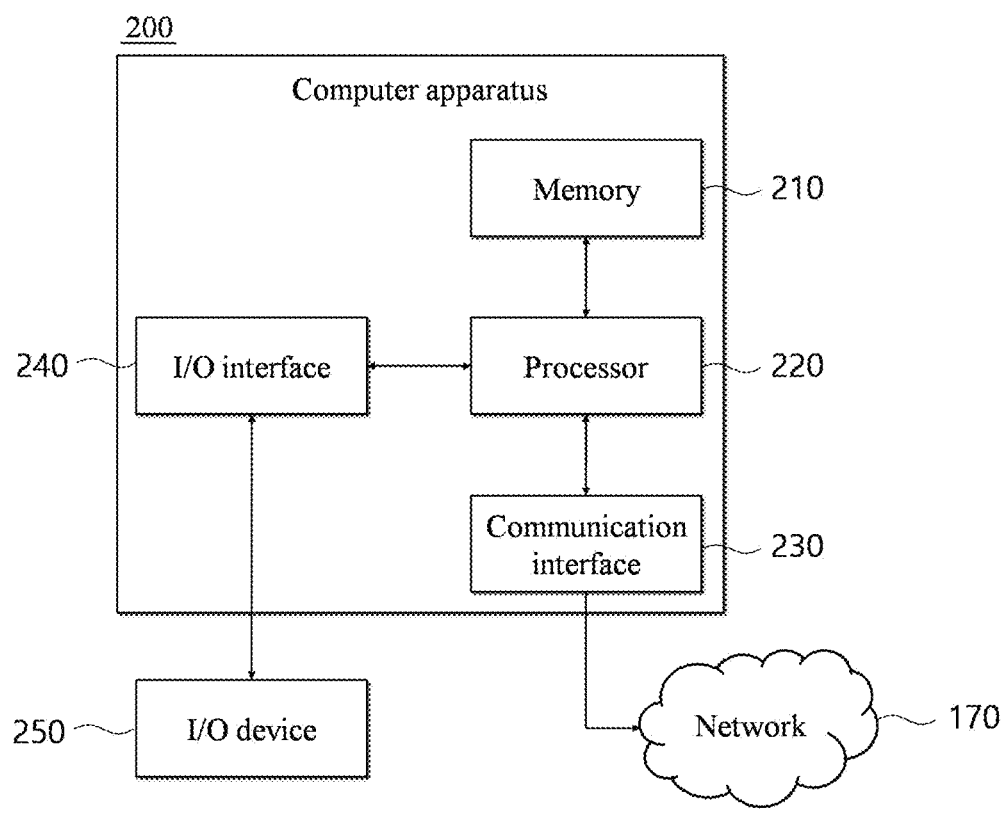
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 40, and/or each of the servers 150 and 160 may be configured as a computer apparatus 200 of FIG. 2. For example, a computer program according to example embodiments may be installed and executed on the computer apparatus 200, and the computer apparatus 200 may perform a secure message providing method according to one or more example embodiments under control of the executed computer program.

Referring to FIG. 2, the computer apparatus 200 may include a memory 210, at least one processor 220, a communication interface 230, and an input/output (I/O) interface 240. The memory 210 may include a permanent mass storage device, such as random access memory (RAM), read only memory (ROM), a disk drive, a solid state drive (SSD), a flash memory, etc., as a non-transitory computer-readable medium. Here, the permanent mass storage device, such as ROM, SSD, flash memory, disk drive, etc., may be included in the computer apparatus 200 as a permanent storage device separate from the memory 210. Also, an OS and at least one program code may be stored in the memory 210. Such software components may be loaded from another non-transitory computer-readable medium separate from the memory 210 to the memory 210. The other non-transitory computer-readable medium may include, for example, a floppy drive, a disk, a tape, a Blu-ray/DVD/CD-ROM drive, a memory card, etc. According to other example embodiments, software components may be loaded to the memory 210 through the communication interface 230, instead of, or in addition to, the non-transitory computer-readable medium. For example, the software components may be loaded to the memory 210 of the computer apparatus 200 based on a computer program installed by files provided over the network 170.

The processor 220 may be configured to process computer-readable instructions of a computer program by performing basic arithmetic operations, logic operations, and I/O operations. The computer-readable instructions may be provided from the memory 210 and/or the communication interface 230 to the processor 220. For example, the processor 220 may be configured to execute received instructions in response to the program code stored in the storage device, such as the memory 210. Additionally, the processor 220 may be two or more processors arranged in a multi-processor configuration, a distributed processor configuration, a cloud computing configuration, etc. Moreover, each processor of the at least one processor 220 may be a multi-core processor, but the example embodiments are not limited thereto.

The communication module 230 may provide a function for communication between the computer apparatus 200 and another apparatus, for example, any of the aforementioned storage apparatuses, over the network 170. For example, the processor 220 of the computer apparatus 200 may transfer a request created based on a program code stored in the storage device such as the memory 210, an instruction, data, a file, etc., to other apparatuses over the network 170 under control of the communication interface 230. Inversely, a signal, an instruction, content, a file, etc., from another apparatus may be received at the computer apparatus 200 through the communication interface 230 of the computer apparatus 200 over the network 170. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, a mouse, and/or a camera, etc., and an output device may include a device, such as a display, a speaker, and/or a haptic feedback device, etc. As another example, the I/O interface 240 may be a device for interface with an apparatus in which an input function and an output function are integrated into a single function, such as a touchscreen, etc. The I/O apparatus 250 may be configured as a single apparatus with the computer apparatus 200, but is not limited thereto.

According to other example embodiments, the computer apparatus 200 may include a greater or lesser number of components than a number of components shown in FIG. 2. For example, the computer apparatus 200 may include at least a portion of the I/O apparatus 250, or may further include other components, for example, a transceiver, a database (DB), and the like.

Figure 3:
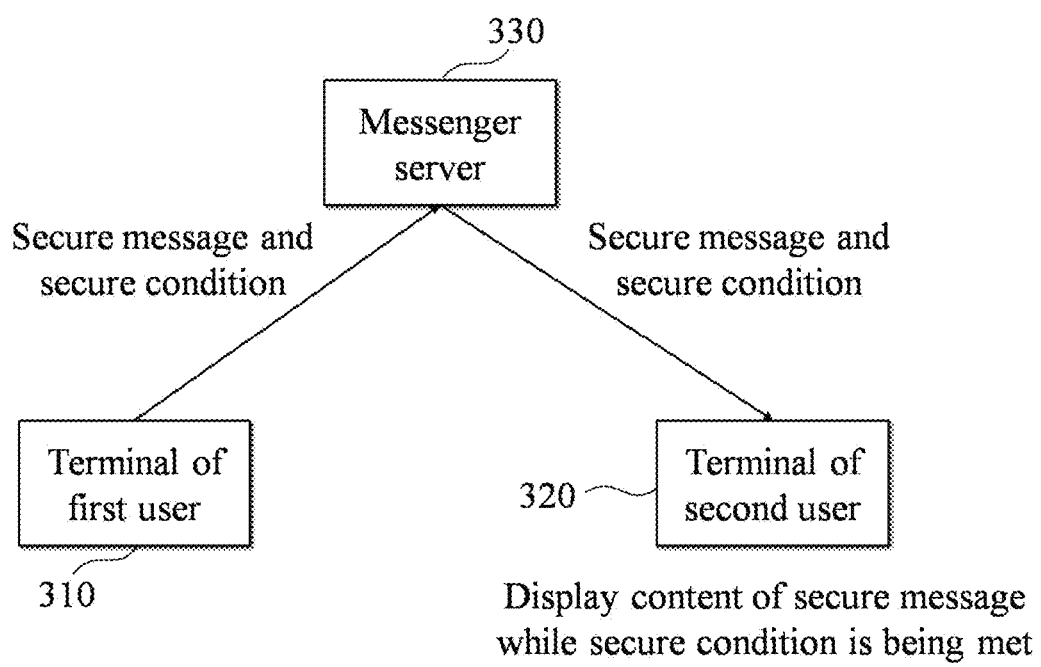
FIG. 3 illustrates an example of an environment in which a secure message providing method is performed according to at least one example embodiment.

FIG. 3 illustrates an example of an environment in which a secure message providing method is performed according to at least one example embodiment. FIG. 3 illustrates a terminal 310 of a first user, a terminal 320 of a second user, and/or a messenger server 330, etc., but the example embodiments are not limited thereto. Here, each of the terminal 310 of the first user and the terminal 320 of the second user may correspond to one of the plurality of electronic devices 110, 120, 130, and 140 of FIG. 1, and may be configured by the computer apparatus 200 of FIG. 2, but are not limited thereto. Similar thereto, the messenger server 330 may correspond to the server 150 of FIG. 1 and may be configured by the computer apparatus 200 of FIG. 2, but is not limited thereto.

Here, FIG. 3 illustrates an example in which the terminal 310 of the first user transmits a secure message and/or a secure condition to the terminal 320 of the second user through the messenger server 330. In detail, a communication session may be established between an account of the first user and an account of the second user through a messaging service provided by the messenger server 330. The terminal 310 of the first user may transmit the secure message and/or the secure condition to the terminal 320 of the second user through the established communication session. Additionally, packets including the secure message and/or the secure condition may be transmitted over the network 170, but is not limited thereto.

Here, the secure message may be configured such that content of the secure message may be displayed through the terminal 320 of the second user when the secure condition set by the terminal 310 of the first user is met by the terminal 320 of the second user. The configuration may be performed under the control of a special purpose computer program that is installed and executed on each of the terminal 310 of the first user and the terminal 320 of the second user. For example, the special purpose computer program installed and executed on the terminal 310 of the first user may be configured to provide the first user with a function capable of setting a secure condition when generating a secure message, and the special purpose computer program installed and executed on the terminal 320 of the second user may be configured to display the secure message when the corresponding secure condition is met. Such special purpose computer programs may be messenger applications for the messaging service provided from the messenger server 330, but are not limited thereto.

For example, the secure condition may include at least one of (1) a first condition that information on at least one of a text, an image, an audio, and/or a video selected or input from the first user on the terminal 310 of the first user is selected, input, displayed, and/or played on the terminal 320 of the second user; (2) a second condition that environment setting information selected or input from the first user on the terminal 310 of the first user is set to the terminal 320 of the second user; and/or (3) a third condition that the terminal 320 of the second user is located at a geographical location or place selected or input from the first user on the terminal 310 of the first user, etc., but the example embodiments are not limited thereto.

As described above, technology for simply encrypting and decrypting a message using a secure key may be appropriate for security of a message during a process of transmitting the message, however, the encryption/decryption of the message using a secure key may be unsuitable for the security of a message when the message has already been received by the recipient and decrypted and thereby displayed. On the contrary, according to at least one example embodiment, since the content of a secure message is displayed while and/or in response to a specific secure condition shared in advance between the first user and the second user is being met, a third user acquiring the terminal 320 of the second user may not verify the content of the secure message unless the third user is aware of the secure condition associated with the secure message.

Regardless of the content or form of the secure condition, the content or form of the secure message may correspond to that of an instant message transmittable and/or receivable through a general messaging service, such as a text, an image, an audio, video, and an emoticon, but the example embodiments are not limited to an instant message and may also include emails, text messages, files, images, videos, audio messages, etc. For example, the first user may generate a general instant message through a messenger application and set a secure condition for converting the instant message to the secure message. Also, the first user may set the secure condition and then generate the instant message.

Figure 4:
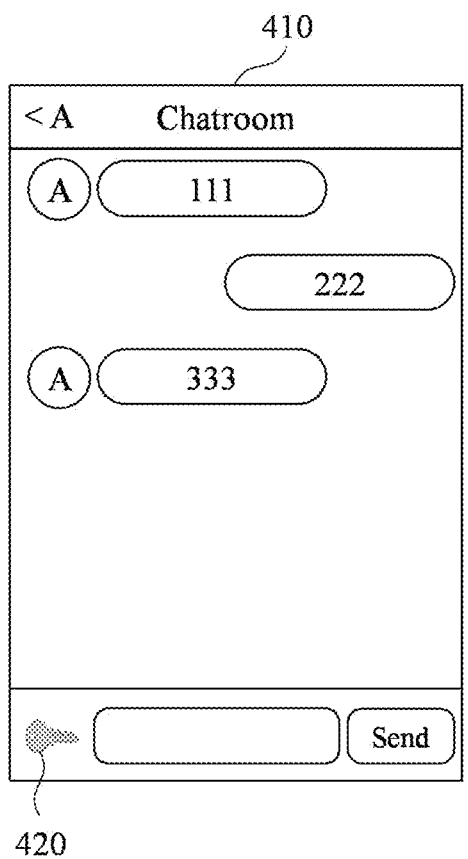
FIGS. 4 and 5 illustrate examples of providing a function for setting a secure condition according to at least one example embodiment.
Figure 5:
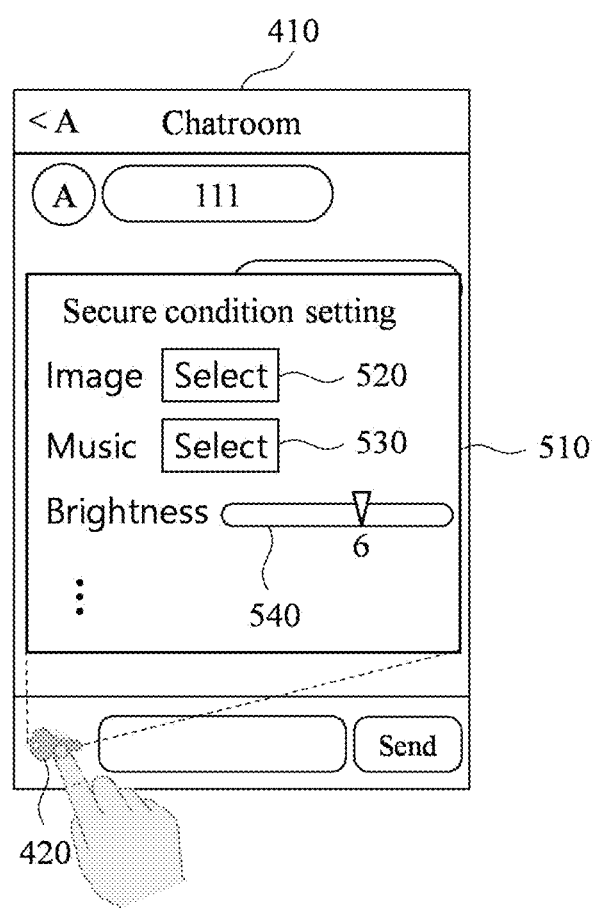

FIGS. 4 and 5 illustrate examples of providing a function for setting a secure condition according to at least one example embodiment.

FIG. 4 illustrates an example of a chatroom between a user A and a user B from perspective of the user B, but the example embodiments are not limited thereto and, for example, may include communication/messaging sessions of other messaging services and the number of users of the communication/messaging session may be greater than two. For example, when a communication session between an account of the user A and an account of the user B is established through a messaging service provided by the messenger server 330 of FIG. 3, a chatroom 410 for the user A and the user B may be generated in response to the communication session. Here, the chatroom 410 may include a user interface 420 capable of providing a function of setting a secure condition.

For example, referring to FIG. 5, in response to the user B selecting the user interface 420, for example, touching an area on which the user interface 420 is displayed with a finger of the user B in a touchscreen environment, etc., a popup window 510 for setting a secure condition may be displayed for the user B. The popup window 510 may include a plurality of types associated with the secure condition, for example, an image, music, and a brightness, etc., and the user B may set a desired value through the popup window 510. For example, a selection button 520 associated with an image may provide a function that enables the user B to select a specific image from among images stored in a terminal of the user B as the secure condition. As another example, a selection button 530 associated with music may provide a function that enables the user B to select specific music from among a variety of music stored in the terminal of the user B as the secure condition. As another example, a brightness related bar 540 may provide a function that enables the user B to set a display brightness as the secure condition.

Although FIG. 5 describes only an image, music, and a brightness as examples of the settable secure condition, various conditions may be settable depending on example embodiments, such as for example, a geographical location, a connected access point (AP) identifier, a connected WiFi identifier, set media volume, a video, a set date and/or time for the secure message to be opened, and/or a connection to a specific URL, etc. That is, any type of secure conditions sharable between the user A and the user B and allowing the terminal of the user to recognize whether a corresponding secure condition is met based on a setting of the user B may be applied. In detail, even for the same music, details of the secure condition may be set by the user B through the terminal of the user B, such as, storing a file of the music, playing the music, or inputting the music through a microphone of the terminal. Contents and/or the requirements of the secure condition may be shared between the user A and the user B, for example, via a communication outside of the communication session that the secure message is transmitted between the user A and the user B, such as in a second communication session using the messaging service, a telephonic conversation, a face-to-face conversation, an email, etc. A condition that enables the terminal of the user A to read whether the set secure condition is met may be used as the secure condition according to one or more example embodiments.

Also, the secure condition may be set for a message that is to be transmitted and/or may be set to a previously transmitted message. In the latter case, contents of existing messages displayed on the chatroom 410 may be modified not to be displayed until the set secure condition is met.

Figure 6:
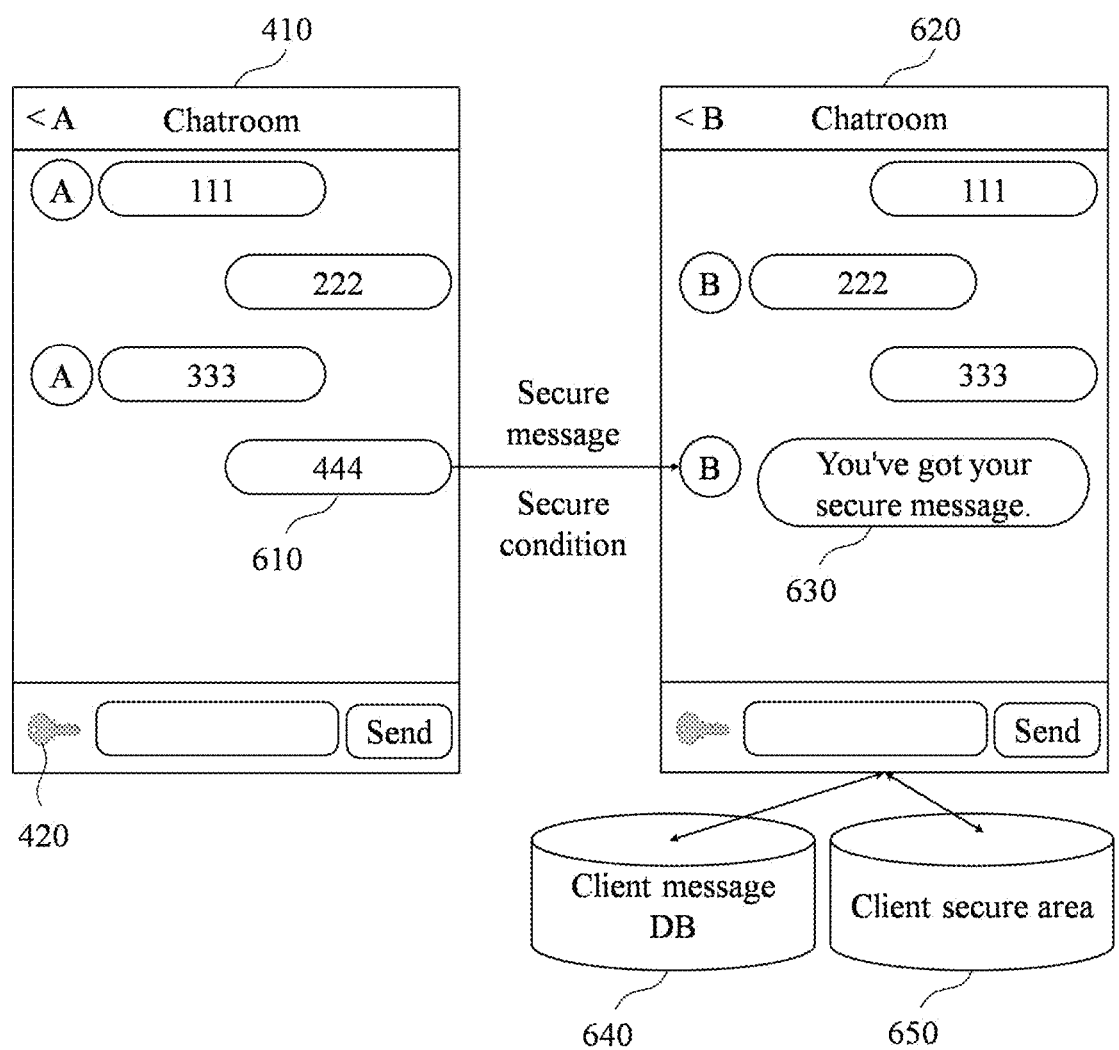
FIG. 6 illustrates an example of transmitting a secure message according to at least one example embodiment.

FIG. 6 illustrates an example of transmitting a secure message according to at least one example embodiment. Hereinafter, an example in which a user A transmits a secure message and/or a secure condition to a user B in response to generating and transmitting a secure message 610 including content '444' to which the secure condition is set will be described with reference to FIG. 6. Here, the content '444' of the secure message 610 is not displayed, but the notification information 630 indicating the arrival of the secure message 610 may be displayed on a chatroom 620 of the user B. If the secure condition is met by a terminal of the user B, the content '444' of the secure message 610 may be displayed on the chatroom 620 of the user B. For example, if the secure condition is met, the notification information 630 may be replaced with the content '444' of the secure message 610 and the content '444' of the secure message 610 may be displayed. On the contrary, if the secure condition is changed to not be met, the content '444' of the secure message 610 may be replaced with the notification information 630 and the notification information 630 may be displayed.

The notification information 630 may be provided using various methods. For example, the notification information 630 may be provided to display only a portion of the content of the secure message 610 or may be provided using an image and/or a text, etc., preset as a default notification. In detail, a messenger application installed and executed on the terminal of the user B may replace the content '444' of the secure message 610 with an image, etc., and may control the terminal of the user B to display only 10% of pixels randomly selected from the entire pixels of the replaced image.

Here, the secure message 610 may be stored and managed in a client message database (DB) 640 that is generated and/or managed by the messenger application of the terminal of the user B. The secure condition may be stored and/or managed in a client secure area 650 that is generated and/or managed by the messenger application or the terminal of the user B. The client secure area 650 may be an area accessible through the authentication of the user B. In other words, the client secure area 650 may block access to the area to users that have not been properly authenticated. Therefore, an access to a secure condition of another user aside from the user B may be blocked. That is, another user excluding the user B that shares the secure condition with the user A in advance may be unaware of the secure condition. Although the other user acquires the terminal of the user B, the other user is unaware of the secure condition and thus, may not access the content '444' of the secure message 610.

Figure 7:
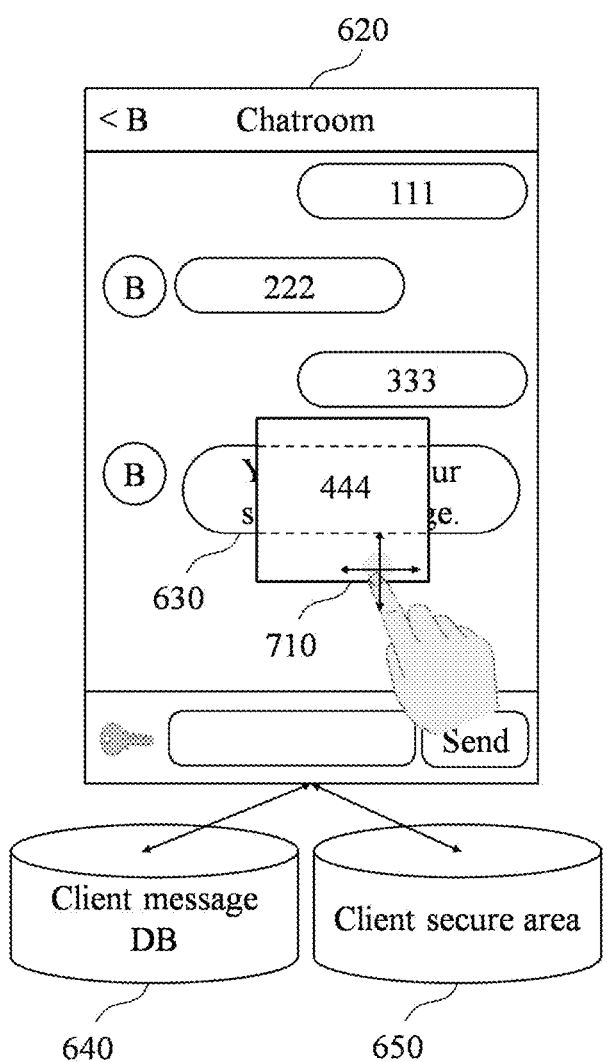
FIG. 7 illustrates an example of displaying a secure message based on a secure condition set through an image according to at least one example embodiment.

FIG. 7 illustrates an example of displaying a secure message based on a secure condition set through an image according to at least one example embodiment. Hereinafter, an example in which the user B calls the same image 710 as an image set as a secure condition and the messenger application installed and executed on the terminal of the user B displays the image 710 on the chatroom 620 will be described with reference to FIG. 7. The messenger application may provide a function that enables the user B to control a location of the image 710. For example, referring to FIG. 7, in response to the user B touching and dragging the image 710 with a finger of the user B, a location of the image 710 may be controlled. Here, in response to overlaying the image 710 on an area on which the notification information 630 is displayed, the content '444' of the secure message 610 is displayed through the overlaid area.

For example, the user A and the user B may share the image 710 known to both the user A and the user B as the secure condition. Here, the user A may select the image 710 through the selection button 520 of the popup window 510 of FIG. 5. In response thereto, the secure message 610 and the image 710 may be transmitted to the user B. If the user B selects the image 710 stored and/or prestored in the terminal of the user B using the function provided from the chatroom 620 instead of selecting the transmitted image 710 as the secure condition, the image 710 selected by the user B may be displayed on the chatroom 620. Here, if the user B controls a display location of the image 710 to overlay the image 710 on the area on which the notification information 630 is displayed, at least a portion of the content of the secure message 610 may be displayed through the overlaid area. To this end, the messenger application installed on the terminal of the user B may monitor whether the secure condition stored in the client secure area 650 is met by the terminal of the user B. For example, in response to a selection of the image 710, the messenger application may compare the image 710 stored in the client secure area 650 to the selected image 710, and, if the stored image 710 and the selected 710 match, may display the image 710 on the chatroom 620. Here, comparing the stored image 710 and the selected image 710 may use a relatively large amount of calculation. Therefore, matching between the stored image 710 and the selected image 710 may be determined by performing an image conversion to a string form.

In one or more of the example embodiments, an action of the user B that selects the image 710 and displays the selected image 710 on the chatroom 620 may be interpreted to meet the secure condition. For example, if the user B selects the image 710 using the function provided through the chatroom 620, the notification information 630 may be replaced with the content '444' of the secure message 610 and the content '444' of the secure message 610 may be displayed on the chatroom 620.

Figure 8:
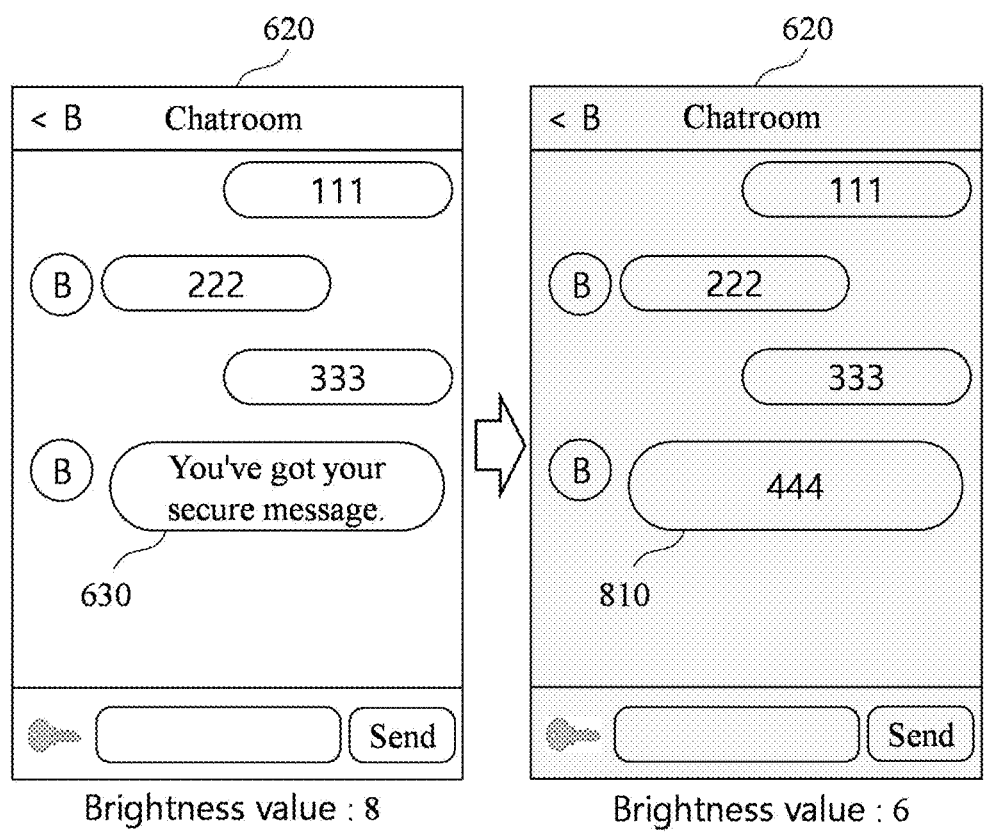
FIG. 8 illustrates an example of displaying a secure message based on a secure condition set through a display brightness according to at least one example embodiment.

FIG. 8 illustrates an example of displaying a secure message based on a secure condition set through a display brightness according to at least one example embodiment. Hereinafter, an example in which a specific brightness value or a brightness value range for a display is set as a secure condition will be described with reference to FIG. 8. For example, it is assumed that the brightness value range includes values from 0 to 9 and the brightness value of 6 is set through the popup window 510 of FIG. 5. In this example, if a brightness value of the display of the terminal of the user B is not 6, for example, 8 as shown on the chatroom 620 on the left of FIG. 8, the secure condition is not met and thus, the notification information 630 may be displayed. If the brightness value of the display of the terminal of the user B is adjusted from 8 to 6, the notification information 630 may be replaced with the content '444' of the secure message 610 and the content '444' may be displayed as shown in a message 810 on the right of FIG. 8.

Figure 9:
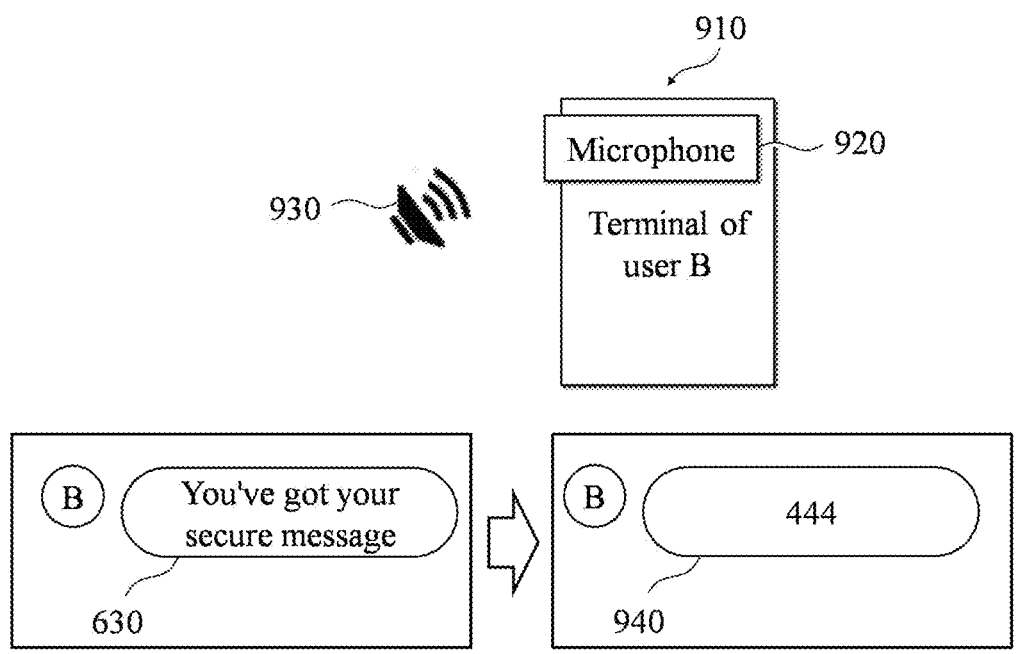
FIG. 9 illustrates an example of displaying a secure message based on a secure condition set through music according to at least one example embodiment.

FIG. 9 illustrates an example of displaying a secure message based on a secure condition set through music according to at least one example embodiment. FIG. 9 illustrates an example 910 of the terminal of the user B and the terminal of the user B including a microphone 920 as an audio input device. Here, specific music is set as the secure condition. While the music set as the secure condition is being input through the microphone 920 from a source 930 like as a speaker, the notification information 630 may be replaced with the content '444' of the secure message 610 and the content '444' may be displayed on a message 940 under control of a messenger application. If the music set as the secure condition is not input through the microphone 920, the messenger application may replace again the content '444' of the secure message 610 with the notification information 630 and display the notification information 630. That is, the messenger application may display the content '444' of the secure message 610 while the secure condition is being met. Here, the input of the music set as the secure condition may be identified in such a manner that the terminal of the user B compares the received music and the music being input through the microphone 920 as the secure condition under control of the messenger application.

Figure 10:
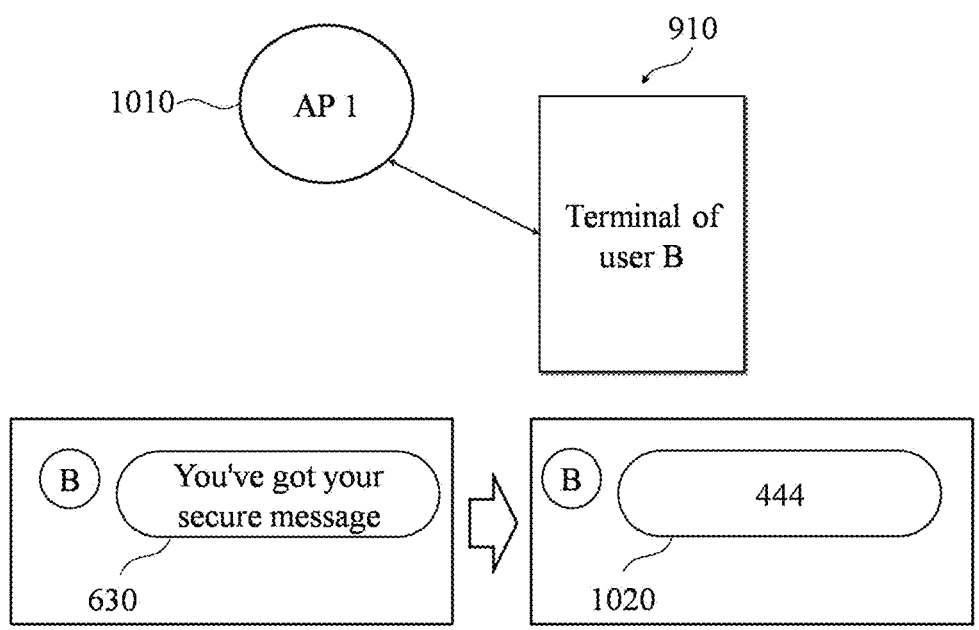
FIG. 10 illustrates an example of displaying a secure message based on a secure condition set through an access point (AP) identifier according to at least one example embodiment.

FIG. 10 illustrates an example of displaying a secure message based on a secure condition set through an access point (AP) identifier according to at least one example embodiment. FIG. 10 illustrates the example 910 of the terminal of the user B and an example in which a connection condition between the terminal of the user B and an AP 1 1010 is set as a secure condition. For example, the popup window 510 of FIG. 5 may provide a function that enables the user A to select one of APs connected to and/or having a connection history to the terminal of the user A. Here, in response to the user A selecting the AP 1 1010, an identifier of the AP 1 1010 may be provided to the user B as the secure condition. In this case, in response to the connection between the terminal of the user B and the AP 1 1010, the messenger application installed and executed on the terminal of the user B may display the content '444' of the secure message 610. Referring to FIG. 10, in response to the connection between the terminal of the user B and the AP 1 1010, the messenger application may replace the notification information 630 with the content '444' of the secure message 610 and may display the content '444' on a message 1020. If the connection between the terminal of the user B and the AP 1 1010 is disconnected, the notification information 630 may be displayed again.

Figure 11:
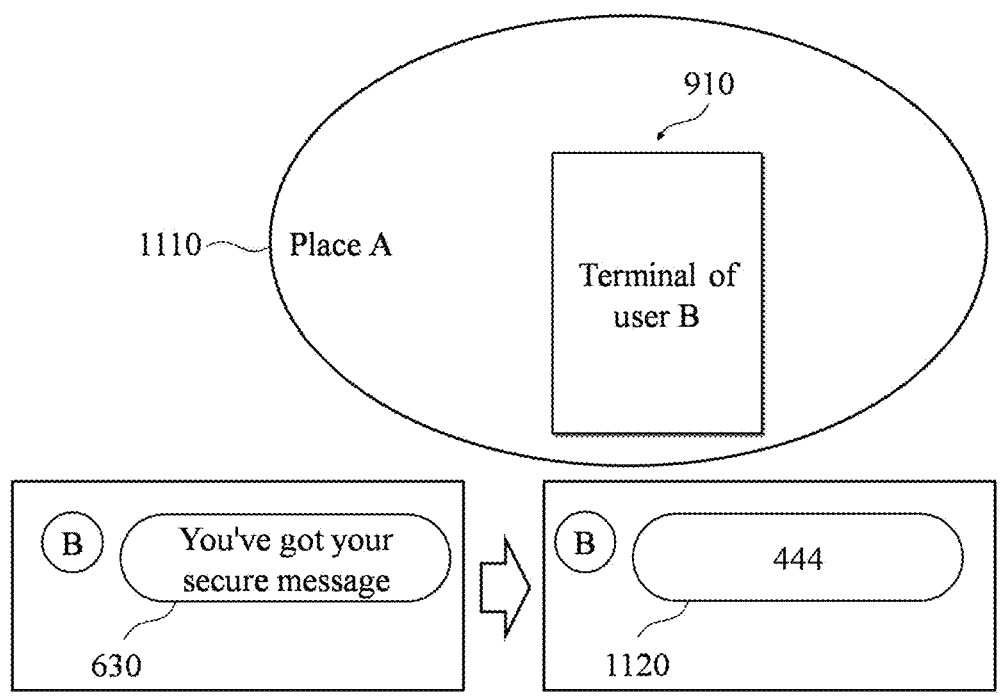
FIG. 11 illustrates an example of displaying a secure message based on a secure condition set through a geographical location according to at least one example embodiment.

FIG. 11 illustrates an example of displaying a secure message based on a secure condition set through a geographical location according to at least one example embodiment. FIG. 11 illustrates the example 910 of the terminal of the user B and an example in which a condition that the terminal of the user B is present in a specific place A 1110 is set as the secure condition. The specific place A 1110 may be an area corresponding to specific GPS coordinates or an area of preset coverage based on the specific GPS coordinates. Additionally, similar to FIG. 10, the range in which the terminal of the user B is connectable to the AP 1 1010 may be set as the specific place A 1110. As another example, the specific place A 1110 may be set as an administration district or around a specific building, for example, an area within coverage from the corresponding building. Here, the messenger application installed and executed on the terminal of the user B may determine that the secure condition is met if the terminal of the user B is determined to be present within the place A 1110 set as the secure condition, and may replace the notification information 630 with the content '444' of the secure message 610 and display the content '444' on a message 1120. If the terminal of the user B is determined to be present outside the place A 1110, the notification information 630 may be displayed again.

The example embodiments may be applied to a process of transmitting a message through a communication session established between, for example, a messenger account of a business owner and a messenger account of a general user. For example, the business owner may state that a terminal of a user C is present within a store of the business owner as a secure condition and may transmit a secure message that includes a coupon as content to the user C. In this case, in response to the user C visiting the store of the business owner, for example, in response to a presence of the terminal of the user C within the store or a connection between the terminal of the user C and an AP of the store, the coupon may be displayed on the terminal of the user C through a chatroom.

Figure 12:
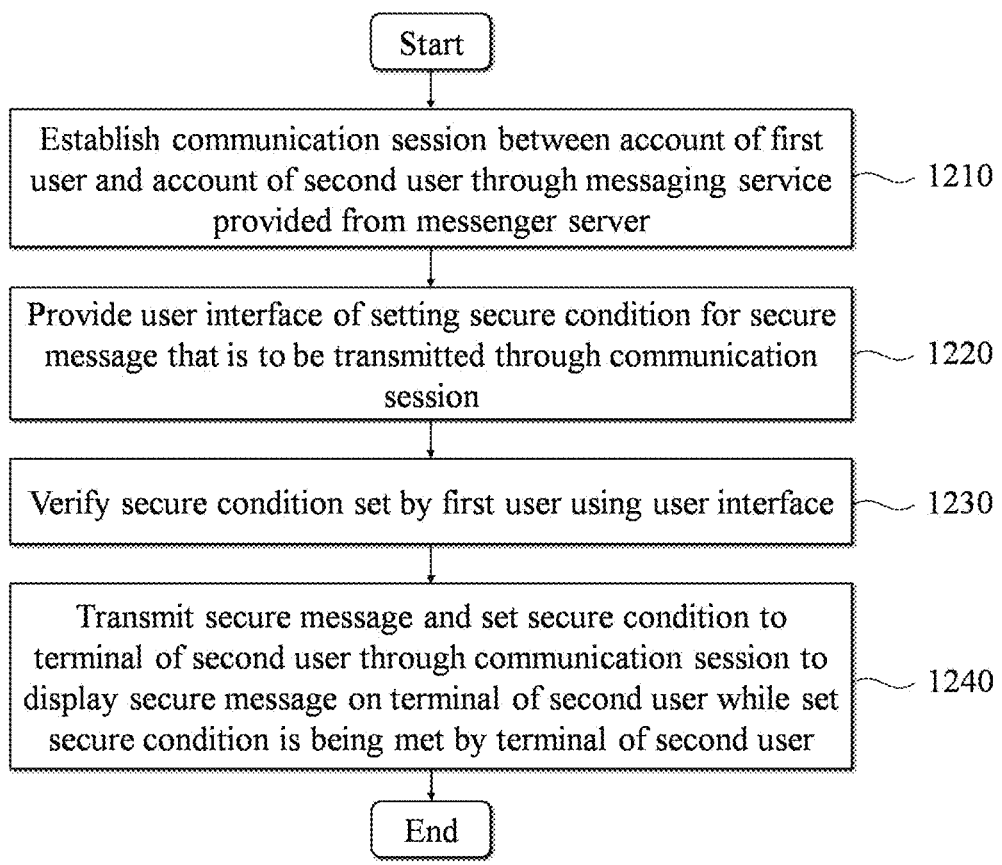
FIG. 12 is a flowchart illustrating an example of a secure message providing method of a transmission side according to at least one example embodiment.

FIG. 12 is a flowchart illustrating an example of a secure message providing method of a transmission side according to at least one example embodiment. The secure message providing method may be performed by the computer apparatus 200 corresponding to a terminal of a transmission side of a secure message. For example, the processor 220 of the computer apparatus 200 may be configured to execute control instructions according to a code of at least one program or a code of an OS included in the memory 210. Here, the processor 220 may control the computer apparatus 200 to perform operations 1210 to 1240 included in the secure message providing method of FIG. 12 in response to the control instruction provided from the code stored in the computer apparatus 200.

Referring to FIG. 12, in operation 1210, the computer apparatus 200 may establish a communication session between an account of a first user and an account of a second user through a messaging service provided from a messenger server. Herein, it is assumed that the first user is a transmission side of the secure message and the second user is a reception side of the secure message. Here, the communication session may correspond to a chatroom and messages input through the chatroom between the first user and the second user may be transmitted and received through the communication session.

In operation 1220, the computer apparatus 200 may provide a user interface of setting a secure condition for a secure message to be transmitted through the communication session. The user interface may be, for example, the popup window 510 of FIG. 5, however, it is provided as an example only. For example, any type of interfaces that allow the first user to set a secure condition according to at least one of various example embodiments may be applied.

As described above, the secure condition may include at least one of (1) a first condition that information on at least one of a first condition that information on at least one of a text, an image, an audio, and/or a video, etc., selected or input from the first user on the terminal of the first user is selected, input, displayed, or played on the terminal of the second user; (2) a second condition that environment setting information selected or input from the first user on the terminal of the first user is set to the terminal of the second user; and (3) a third condition that the terminal of the second user is located at a geographical location or place selected or input from the first user on the terminal of the first user, etc., or a combination or a sub-combination thereof.

In operation 1230, the computer apparatus 200 may verify the secure condition set by the first user using the user interface. As described above, the user interface may provide a function that enables the first user to set the secure condition, such as for example, the popup window 510 of FIG. 5.

In operation 1240, the computer apparatus 200 may transmit the secure message and the set secure condition to the terminal of the second user through the communication session to display the secure message on the terminal of the second user while the set secure condition is being met by the terminal of the second user.

According to an example embodiment, the computer apparatus 200 may verify an image that is selected or input from the first user as the secure condition. In this case, in operation 1240, the computer apparatus 200 may transmit the secure message and the verified message to the terminal of the second user through the communication session to display the secure message on the terminal of the second user while the verified input is selected or input from the terminal of the second user and is being displayed through the user interface. An example of displaying the secure message through such an image is described above with reference to FIG. 7.

According to another example embodiment, the computer apparatus 200 may verify a brightness value or a brightness value range of a display selected or input from the first user as the secure condition. In this case, in operation 1240, the computer apparatus 1240 may transmit the secure message and the selected or input brightness value or brightness value range to the terminal of the second user through the communication session to display the secure message on the terminal of the second user while a brightness value of a display of the terminal of the second user is corresponding to the verified brightness value or brightness value range. An example of using such a brightness value is described above with reference to FIG. 8.

According to another example embodiment, the computer apparatus 200 may verify audio data selected or input from the first user as the secure condition. In this case, in operation 1240, the computer apparatus 200 may transmit the secure message and the verified audio data to the terminal of the second user through the communication session to display the secure message on the terminal of the second user while the verified audio data is being input through an audio input device included in the terminal of the second user. An example of displaying content of the secure message while music input as the secure condition is being input through the microphone 920 is described above with reference to FIG. 9.

Those skilled in the art may understand from the foregoing description that various types of secure conditions, for example, a specific color or media volume, a bell sound volume, geographical location, environmental setting information, and/or a network state, etc., may be set and used, in addition to the aforementioned example embodiments. A level of security may vary based on a type of a set secure condition. For example, the secure condition for using an image or music may require a relatively high level of security compared to that of the secure condition for using a brightness of a display. Also, although the same secure condition is used, a level of security may relatively vary depending on a user. For example, although the same location is used as the secure condition, a level of security may vary depending on accessibility of the user to the corresponding location.

Figure 13:
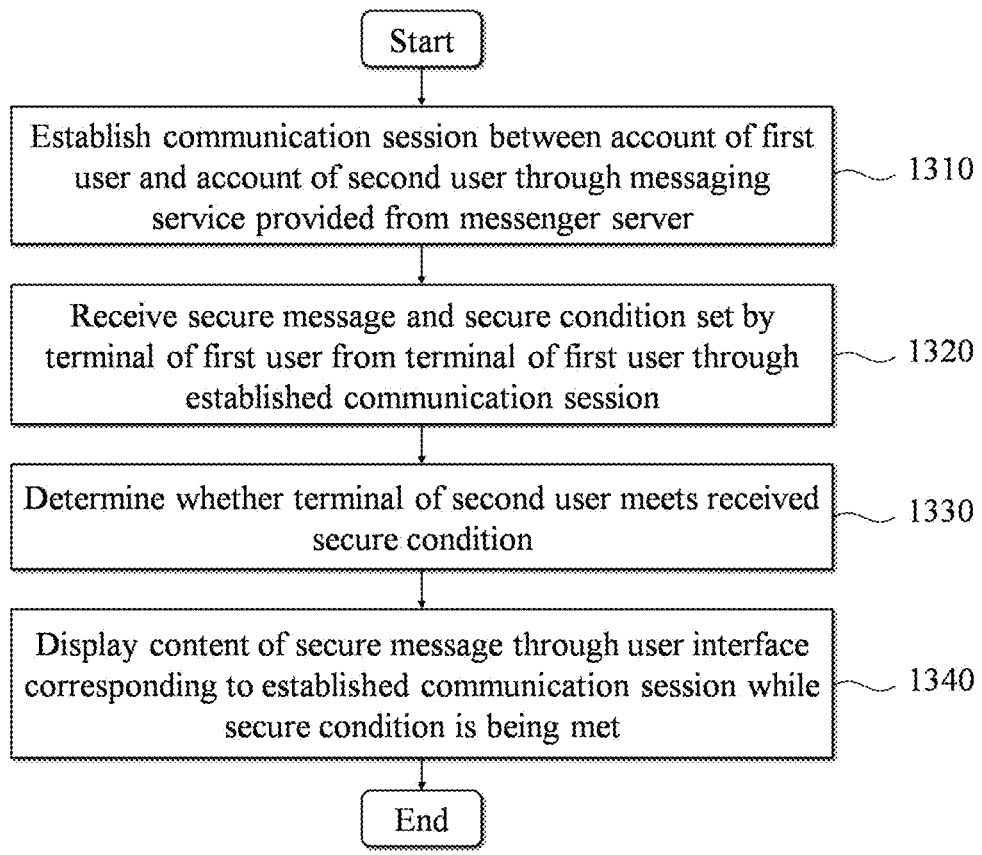
FIG. 13 is a flowchart illustrating an example of a secure message providing method of a reception side according to at least one example embodiment.

FIG. 13 is a flowchart illustrating an example of a secure message providing method of a reception side according to at least one example embodiment. The secure message providing method may be performed by the computer apparatus 200 corresponding to a terminal of a reception side of a secure message. For example, the processor 220 of the computer apparatus 200 may be configured to execute control instructions according to a code of at least one program or a code of an OS included in the memory 210. Here, the processor 220 may control the computer apparatus 200 to perform operations 1310 to 1340 included in the secure message providing method of FIG. 13 in response to the control instruction provided from the code stored in the computer apparatus 200.

Referring to FIG. 13, in operation 1310, the computer apparatus 200 may establish a communication session between an account of a first user and an account of a second user through a messaging service provided from a messenger server. Operation 1310 may correspond to operation 1210 of FIG. 12.

In operation 1320, the computer apparatus 200 may receive a secure message and/or a secure condition set by the terminal of the first user from the terminal of the first user through the established communication session. For example, operation 1320 may be a process of receiving the secure message and the secure condition transmitted in operation 1240 of FIG. 12.

As described above, the secure condition may include at least one of (1) a first condition that information on at least one of a first condition that information on at least one of a text, an image, an audio, and/or a video, etc., selected or input from the first user on the terminal of the first user is selected, input, displayed, or played on the terminal of the second user; (2) a second condition that environment setting information selected or input from the first user on the terminal of the first user is set to the terminal of the second user; and/or (3) a third condition that the terminal of the second user is located at a geographical location or place selected or input from the first user on the terminal of the first user, etc.

Here, the computer apparatus 200 may store the received secure message in a message database of the terminal of the second user and may store the secure condition in a secure area of the terminal of the second user.

In operation 1330, the computer apparatus 200 may determine whether the terminal of the second user meets the received secure condition.

For example, the secure condition may include an image that is selected or input from the first user on the terminal of the first user. In this case, in operation 1330, the computer apparatus 200 may determine that the received condition is met while the same image as the image included in the secure condition is selected or input through a function of the user interface on the terminal of the second user and is being displayed through the user interface. The user interface of FIG. 13 may correspond to a chatroom provided through the terminal of the second user under control of a messenger application installed and executed on the terminal of the second user. As described above with reference to FIG. 7, the computer apparatus 200 may display at least a portion of content of the secure message through image overlay depending on example embodiments. For example, the computer apparatus 200 may set a first area associated with the secure message to the user interface. In this case, the computer apparatus 200 may display, on the user interface, the same image selected or input through the function of the user interface on the terminal of the second user, and may adjust a location of a second area on which the same image is displayed in response to an input of the second user on the same image displayed on the user interface. The computer apparatus 200 may display at least a portion of the content of the secure message on a third area on which the second area is overlaid on the first area. Even in this case, if the image selected or input through the function of the user interface matches an image included in the secure condition, at least a portion of the content of the secure message may be displayed.

According to another example embodiment, the secure condition may include a brightness value or a brightness value range of a display selected or input from the first user on the terminal of the first user. In this case, in operation 1330, the computer apparatus 200 may determine that the received secure condition is met while a brightness value of a display of the terminal of the second user is corresponding to the brightness value or the brightness value range included in the secure condition. It is described above with reference to FIG. 8.

According to another example embodiment, the secure condition may include audio data selected or input from the first user on the terminal of the first user. In this case, the computer apparatus 200 may determine that the received secure condition is met while the audio data included in the secure condition is being input through an audio input device included in the terminal of the second user. For example, an example of displaying content of the secure message while music set as the secure condition is being input through the microphone 920 is described above with reference to FIG. 9.

Those skilled in the art may easily understand from the foregoing description that various types of secure conditions, for example, a specific color or media volume, a bell sound volume, geographical location, environmental setting information, and/or a network state, etc., may be set and used, in addition to the aforementioned example embodiments.

In operation 1340, the computer apparatus 200 may display content of the secure message through a user interface corresponding to the established communication session while the secure condition is being met. As described above, if the received secure condition is not met, the computer apparatus 200 may display notification information regarding reception of the secure message through the user interface. In this case, the computer apparatus 200 may replace the notification information with the content of the secure message and display the content of the secure message through the user interface while the secure condition is being met.

The notification information may be preset as default or may be directly set by the first user. For example, the first user may transmit information, such as a text, an image, and/or a video, etc., to be displayed as the notification information, through the terminal of the first user. If the secure condition is not met, the computer apparatus 200 may display the notification information received from the terminal of the first user through the user interface instead of displaying the content of the secure message (e.g., enabling the contents of the secure message to be displayed on the user interface). For example, the computer apparatus 200 may display emoticon or a picture, such as, for example, '^_^', preset between the first user and the second user as the notification information instead of displaying the notification information set as the default, to prevent another user, excluding the first user and the second user, from recognizing that the corresponding message is the secure message.

According to one or more example embodiments, it is possible to protect content of a secure message by limiting content of the secure message to be verifiable while a secure condition set by a first user side is being met by a second user side with respect to secure messages transmitted and received between users through a messaging service.

The systems and or apparatuses described herein may be implemented using hardware components, software components, and/or a combination thereof. For example, a processing device may be implemented using for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable medium storing computer readable instructions that, when executed by at least one processor, cause the at least one processor to perform a secure message providing method on a computer apparatus, the secure message providing method comprising:
    establishing a communication session between an account of a first user and an account of a second user through a messaging service;
    receiving a secure message from a first terminal of the first user through the established communication session, the secure message including content that is hidden;

receiving a secure condition corresponding to the secure message through the established communication session, the secure condition set by the first user;

determining whether a condition of a second terminal of the second user meets the received secure condition; and displaying the content of the secure message on the second terminal through a user interface corresponding to the established communication session while the secure condition is being met, the content being enabled for viewing by the second user, wherein the secure condition includes a brightness value or a brightness value range of a display selected or input from the first user on the first terminal; and the determining comprises determining that the received secure condition is met while a brightness value of a display of the second terminal corresponds to the brightness value or the brightness value range included in the secure condition.

2. The non-transitory computer-readable medium of claim 1, wherein the secure condition further includes at least one of:

a first condition that information on at least one of a text, an image, an audio, and a video selected or input from the first user on the first terminal of the first user is selected, input, displayed, and/or played on the second terminal;

a second condition that environment setting information selected or input from the first user on the first terminal of the first user is set to the second terminal of the second user; and a third condition that the second terminal of the second user is located at a geographical location or place selected or input from the first user on the first terminal of the first user.

3. The non-transitory computer-readable medium of claim 1, wherein the secure message providing method further comprises:

storing the received secure message in a message database on the second terminal; and storing the secure condition in a secure area of the second terminal.

4. The non-transitory computer-readable medium of claim 1, wherein the secure condition includes an image selected or input by the first user on the first terminal; and the determining comprises determining that the received secure condition is met while the same image as the image included in the secure condition is selected or input through a function of the user interface displayed on the second terminal and is being displayed through the user interface.

5. The non-transitory computer-readable medium of claim 4, wherein the secure message providing method further comprises, setting a first area in the user interface, the first area associated with the secure message; and the displaying further comprises, displaying, on the user interface, the same image selected or input through the function of the user interface on the second terminal, adjusting a location of a second area on which the same image is displayed in response to an input of the second user on the same image displayed on the user interface, and displaying at least a portion of the content of the secure message on a third area of the user interface on which the second area is overlaid on the first area.

6. The non-transitory computer-readable medium of claim 1, wherein the secure condition includes audio data selected or input from the first user on the first terminal of the first user; and the determining comprises determining that the received secure condition is met while the audio data included in the secure condition is being input through an audio input device included in the second terminal.

7. The non-transitory computer-readable medium of claim 1, wherein the secure message providing method further comprises, displaying notification information through the user interface in response to the received secure condition not being met, the notification information regarding reception of the secure message, and the displaying of the content of the secure message further comprises, replacing the notification information with the content of the secure message, and displaying the content of the secure message through the user interface while the secure condition is being met, the content being enabled for viewing.

8. The non-transitory computer-readable medium of claim 7, wherein the receiving comprises further receiving display information to be displayed as the notification information from the first terminal; and the displaying of the notification information comprises displaying the received display information through the user interface as the notification information.

9. A non-transitory computer-readable medium storing computer readable instructions that, when executed by at least one processor, cause the at least one processor to perform a secure message providing method on a computer apparatus, the secure message providing method comprising:

establishing a communication session between an account of a first user and an account of a second user through a messaging service;

generating a user interface, the user interface for setting a secure condition for a secure message, the secure message including content that is hidden;

verifying the secure condition set by the first user on a first terminal of the first user using the user interface; and transmitting the secure message and the set secure condition to a second terminal of the second user through the communication session, the transmitting of the secure message causing the second terminal to display the secure message while the set secure condition is being met by the second terminal, the content being enabled for viewing by the second user, wherein the verifying comprises verifying a brightness value or a brightness value range of a display selected or input by the first user as the secure condition, and the transmitting comprises transmitting the secure message and the selected or input brightness value or brightness value range to the second terminal through the communication session, the transmitted secure message causing the second terminal to display the secure message while a brightness value of a display of the second terminal corresponds to the verified brightness value or brightness value range.

10. The non-transitory computer-readable medium of claim 9, wherein the secure condition comprises at least one of:
- a first condition that information on at least one of a text, an image, an audio, and a video selected or input from the first user on the first terminal of the first user is selected, input, displayed, and/or played on the second terminal;
- a second condition that environment setting information selected or input by the first user on the first terminal of the first user is set to the second terminal of the second user; and
- a third condition that the second terminal of the second user is located at a geographical location or place selected or input from the first user on the first terminal of the first user.

11. The non-transitory computer-readable medium of claim 9, wherein
- the verifying comprises verifying an image selected or input by the first user as the secure condition; and
- the transmitting comprises transmitting the secure message and the verified image to the second terminal through the communication session, the transmitted secure message causing the second terminal to display the secure message while the verified image is selected or input by the second user and is being displayed on the second terminal through the user interface.

12. The non-transitory computer-readable medium of claim 9, wherein
- the verifying comprises verifying audio data selected or input by the first user as the secure condition; and
- the transmitting comprises transmitting the secure message and the verified audio data to the second terminal through the communication session, the transmitted secure message causing the second terminal to display the secure message while the verified audio data is being input through an audio input device included in the second terminal.

13. A secure message providing method comprising:
- establishing, using at least one processor, a communication session between an account of a first user and an account of a second user through a messaging service;
- receiving, using the at least one processor, a secure message from a first terminal of the first user through the established communication session, the secure message including content that is hidden;
- receiving, using the at least one processor, a secure condition corresponding to the secure message through the established communication session, the secure condition set by the first user;
- determining, using the at least one processor, whether a second terminal of the second user meets the received secure condition; and
- displaying, using the at least one processor, the content of the secure message through a user interface corresponding to the established communication session while the secure condition is being met, the content being enabled for viewing by the second user,
wherein the secure condition comprises a brightness value or a brightness value range of a display selected or input by the first user, and
the determining comprises determining that the received secure condition is met while a brightness value of a display of the second terminal of the second user corresponds to the brightness value or the brightness value range included in the secure condition.

14. The secure message providing method of claim 13, wherein the secure condition further includes at least one of:
- a first condition that information on at least one of a text, an image, an audio, and a video selected or input from the first user on the first terminal of the first user is selected, input, displayed, and/or played on the second terminal;
- a second condition that environment setting information selected or input by the first user on the first terminal of the first user is set to the second terminal of the second user; and
- a third condition that the second terminal of the second user is located at a geographical location or place selected or input from the first user on the first terminal of the first user.

15. The secure message providing method of claim 13, wherein
- the secure condition comprises image data selected or input by the first user; and
- the determining comprises determining that the received condition is met while the same image as the image included in the secure condition is selected or input through a function of the user interface on the second terminal and is being displayed through the user interface.

16. The secure message providing method of claim 13, wherein
- the secure condition comprises audio data selected or input by the first user; and
- the determining comprises determining that the received secure condition is met while the audio data included in the secure condition is being input through an audio input device included in the second terminal.

* * * * *